(12) United States Patent
Hyerle et al.

(10) Patent No.: US 8,295,448 B2
(45) Date of Patent: Oct. 23, 2012

(54) COMMUNICATION SYSTEM AND METHOD

(75) Inventors: Robert H. Hyerle, Bernin (FR); Alain Comment, Echirolles (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1083 days.

(21) Appl. No.: 11/716,991

(22) Filed: Mar. 12, 2007

(65) Prior Publication Data

US 2007/0286389 A1 Dec. 13, 2007

(30) Foreign Application Priority Data

Mar. 13, 2006 (EP) .................................. 06300224

(51) Int. Cl.
*H04M 1/64* (2006.01)
(52) U.S. Cl. ................................ 379/88.19; 379/207.01
(58) Field of Classification Search .................. 379/207, 379/88, 88.03, 88.01, 210, 211, 212, 216, 379/1
See application file for complete search history.

(56) References Cited

U.S. PATENT DOCUMENTS

| | | | | |
|---|---|---|---|---|
| 6,055,307 | A * | 4/2000 | Behnke et al. | 379/265.14 |
| 6,067,347 | A * | 5/2000 | Farris et al. | 379/88.01 |
| 6,301,246 | B1 * | 10/2001 | Shaffer et al. | 370/352 |
| 6,801,618 | B2 * | 10/2004 | Nygren et al. | 379/265.06 |
| 7,844,045 | B2 * | 11/2010 | Contolini et al. | 379/265.12 |
| 2002/0071537 | A1 * | 6/2002 | Gainsboro | 379/188 |
| 2003/0215069 | A1 * | 11/2003 | Hitzeman | 379/88.19 |
| 2005/0210268 | A1 * | 9/2005 | Duke et al. | 713/186 |

FOREIGN PATENT DOCUMENTS

| | | |
|---|---|---|
| EP | 0 981 237 A | 2/2000 |
| WO | 2005/031544 A | 4/2005 |

OTHER PUBLICATIONS

"Outbound Call Security Using Speech Recognition" IP.COM Journal, IP.COM Inc., West Henrietta, NY, US, p. 1 (Aug. 6, 2004).
Reynolds, Douglas A., "An Overview of Automatic Speaker Recognition Technology", *IEEE International Conference on Acoustics, Speech, and Signal Processing*, vol. 4 of 4, pp. 4072-7075 (May 13, 2002).

* cited by examiner

*Primary Examiner* — Curtis Kuntz
*Assistant Examiner* — Amal Zenati

(57) ABSTRACT

According to one embodiment of the present invention there is provided a communication method comprising the steps of making a determination in respect of at least initiating a first call between first and second communication devices having first and second contact numbers respectively; said making the determination comprising identifying at least one of the first and second contact numbers associated with said initiating, accessing a database comprising at least a first monitored contact number and at least one associated third party number corresponding to a third communication device, determining whether or not at least one of a first contact number and the second contact number match the first monitored contact number; and establishing, in response to the determination, a third party call to the third communication device.

16 Claims, 4 Drawing Sheets

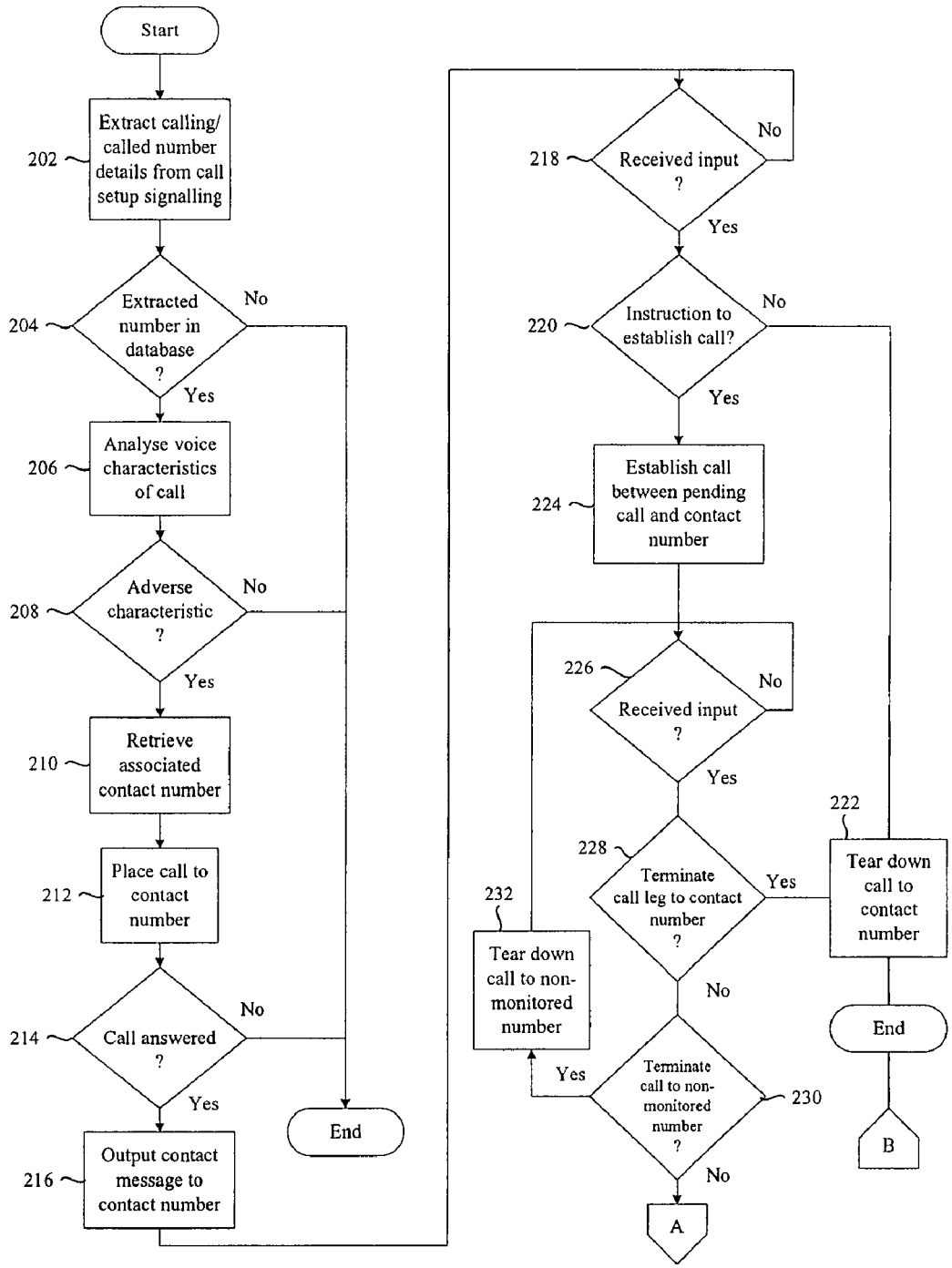

COMMUNICATION SYSTEM AND METHOD

FIELD OF THE INVENTION

Embodiments of the present invention relate to a communication system and method.

BACKGROUND TO THE INVENTION

Parents are increasingly concerned about the ease with which their children can communicate with strangers given the proliferation of personal communication devices such as mobile phones, PDAs and computers. This issue is also exacerbated by the wide availability of chat rooms via the Internet. Efforts have been made to monitor a child's use of a computer for accessing the Internet. For example, software that monitors any keystrokes performed while using a computer can be used to monitor a child's use of a computer and, more particularly, a chat room. The keystrokes can be later analysed by a parent. However, the inability to monitor telephone calls and the like such as VoIP remains a parental concern.

SUMMARY OF INVENTION

Accordingly, a first aspect of embodiments of the present invention provides a communication method comprising the steps of
    making a determination in respect of at least initiating a first call between first and second communication devices having first and second contact numbers respectively; said making the determination comprising
        identifying at least one of the first and second contact numbers associated with said initiating,
        accessing a database comprising at least a first monitored contact number and at least one associated third party number corresponding to a third communication device,
        determining whether or not at least one of a first contact number and the second contact number match the first monitored contact number; and
    establishing, in response to the determination, a third party call to the third communication device.

Advantageously, embodiments of the present invention allow a communication system to be realised that supports parental intervention in inappropriate telephone calls with a view to protecting their children.

Embodiments provide a method in which the step of making the determination comprises the steps analysing voice data associated with the first call to determine a characteristic of the voice data. Accordingly, preferred embodiments provide a method in which the step of the analysing the voice data associated with the first call to determine a characteristic of the voice data comprises analysing voice data associated with the first call to determine if the voice data is characteristic of at least one of a male or a female voice. For example, assuming a family has a teenage daughter, detecting a mature male voice may be the trigger for establishing a call leg to a parent.

Embodiments provide a method in which the step of analysing the voice data associated with the first call to determine a characteristic of the voice data comprises analysing the voice data associated with the first call to determine whether or not it has a characteristic of voice data associated with a predetermined individual. Advantageously, a specific voice profile can be established for a third party with whom a child, or other person, has been asked not to converse or correspond.

Embodiments provide a communication method in which the step of establishing a third party call to the third communication device comprises the step of establishing a voice path from at least one of the first and second communication devices to the third communication device. Such embodiments provide, for example, a listen-only mode of operation in which a contacted third party can listen to a communication without making a contribution to that communication.

Embodiments provide a communication method in which the step of establishing a third party call to the third communication device comprises the step of establishing a voice path from the third communication device of the third party call to support voice communication between a third party and at least one of the first and second communication devices. Such embodiments support both listen and speech modes of operation in which a contacted third party can make a contribution to the communication between the first and second parties.

Embodiments provide a communication method in which the step of establishing a voice path from the third communication device to the third party call to support voice communication between a third party and at least one of the first and second communication devices is responsive detecting an input via the third communication device associated with the third party.

Embodiments provide a communication method further comprising the step of recording voice data associated with at least one of the first call and the third party call.

Embodiments provide a communication method further comprising the step of terminating a call leg to a selectable one of the first and second communication devices.

Embodiments provide a communication method in which the step of making a determination comprises determining whether or not at least one of the first communication device and the second communication device match a number to be monitored.

Embodiments provide a communication method comprising the step of terminating the third party call. Advantageously, once a parent has been reassured that all is well, that is, that the call is acceptable, the call leg to the third communication device can be terminated. This has the advantage that the calling parties are unaware of the protective parental investigation.

Embodiments provide a communication method in which the step of terminating the third party call is responsive to a command received via the third communication device. In preferred embodiments, the third party determines when the call leg to the third communication device is terminated. For example, the third party may merely hang up the call, that is, go on-hook or may press some other key to terminate their leg of the call.

Embodiments provide a communication system comprising means to implement a method as claimed or described herein.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or other form of memory or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as described or claimed herein and a machine readable storage storing such a program.

BRIEF DESCRIPTION OF THE DRAWINGS

Embodiments of the present invention will now be described, by way of example only, with reference to the accompanying drawings in which.

DETAILED DESCRIPTION OF PREFERRED EMBODIMENTS

Figure 1:
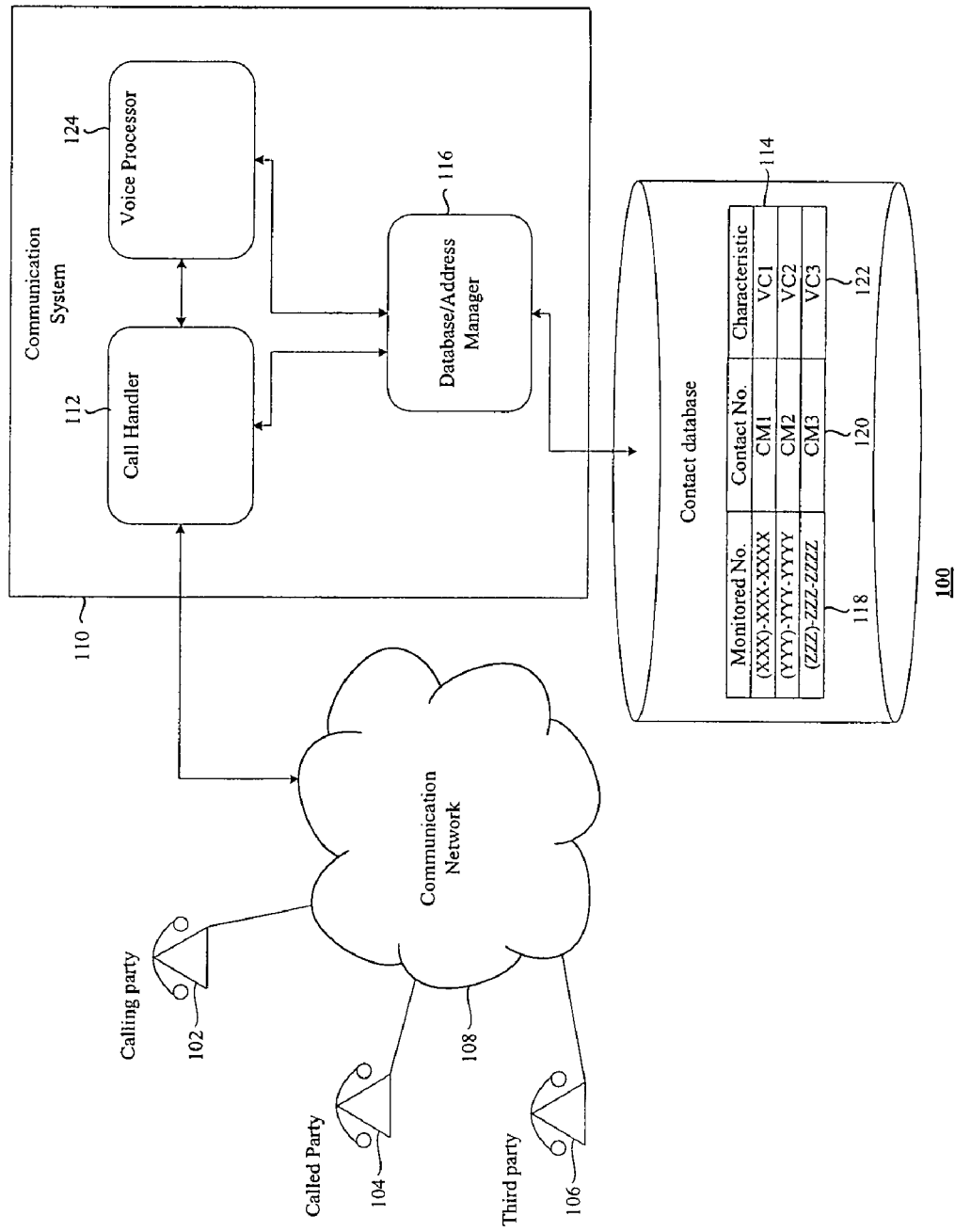
FIG. 1 illustrates, schematically, a communication arrangement comprising a communication system according to an embodiment.

Referring to FIG. 1, there is shown, schematically, a communication arrangement 100 comprising a plurality of communication devices 102 to 106. The communication devices have been illustrated as being telephones. However, embodiments can be realised using any other form of communication device such as, for example, a mobile telephone, a mobile computing device such as, for example, a laptop computer, a mobile computer or a PDA. The communication devices comprise a calling party communication device 102, that is, a first communication device used to instigate a call, a called party communication device 104, that is, a second communication device, which is the intended recipient a call instigated from the calling party communication device 102, and a third communication device 106 that is alerted to the existence of a call between the first communication device 102 and the second communication device 104 subject to a condition precedent or that in notified of initiation of a call to the second communication device 104.

The communication devices 102 to 106 are coupled to a communication network 108 that, in turn, is connected to a communication system 110 according to an embodiment. The communication system 110 is able to monitor at least one of call set up between the calling party communication device 102 and the called party communication device 104 and the exchange of voice data between those devices 102 and 104. The communication system 110 comprises a call handler 112 that is responsible, in embodiments that monitor call set up between the first communication device 102 and the second communication device 104, for at least noting that call set up has been instigated. The call handler 112, using the call setup information, accesses a database 114, a via a database manager 116, comprising a plurality of monitored numbers 118.

The monitored numbers 118 may represent numbers for which, in the event of a telephone call being instigated from that number, a call leg should be established to a third communication device associated with the third communication device 106. Preferably, establishing the call leg to the third communication device only takes place if a call is established between the first communication device 102 and the second communication device 104. Alternatively, or additionally, the monitored numbers 118 may represent numbers for which, in the event of a telephone call being instigated to such a number, a call leg should be established to the third communication device associated with the third communication device 106. Suitably, the database 114 also comprises a plurality of contact numbers 120, associated with respective monitored numbers 118, to which a call should be placed.

Alternatively, or additionally, the monitored numbers 118 may represent numbers for which, in the event of a condition precedent being satisfied, a call leg should be established to a third communication device associated with the third communication device 106. Preferably, establishing the call leg to the third communication device only takes place if a call is established between the first communication advice 102 and the second communication device 104 and the condition precedent is satisfied. In preferred embodiments, the condition precedent is associated with a characteristic of the call and, more particularly, is associated with a voice characteristic of voice data of the call. Suitably, preferred embodiments are provided in which the database 114 comprises a plurality of characteristics 122 in the form of, for example, voice models $VC_1$ to $VC_3$. In such embodiments, voice data associated with a call between the first communication device 102 and the second communication device 104 is routed via the call handler 112 to a voice processor 124 that analyses the voice data. In a preferred embodiment, the plurality of characteristics 122 represent voice models of voice data typically associated with a male voice. The voice processor 124 determines whether or not there is a match between voice data associated with a call between the first communication device 102 and the second communication device 104 and provides an indication to that effect to the call handler 112. The call handler 112, given the indication from the voice processor 104 as to whether or not there is such a match, takes appropriate action accordingly.

The voice models might be generic models that reflect general traits of male and female voices or they might be specific to individuals.

Assuming there is a match between voice data of the call between the first communication device 102 and the second communication device 104 and an associated voice model such as, for example, $VC_1$, the communication system 110 instigates call set up to an associated contact number, $CM_1$. The call setup can be undertaken by the call handler 112. Alternatively, the call handler 112 can request such call set up to be undertaken by some other entity either within or without the communication system 110. For example, the communication system 110 may comprise an entity capable of SS7 signalling or the communication system 110 may instruct a network entity capable of call set up to establish a call to the contact number.

The following establishing a call leg to the third communication device, in preferred embodiments, voice data associated with the call between the first 102 and second 104 communication devices is copied or also routed to that third communication device 106. This allows, for example, a protective parent to listen to the communication exchange and decide whether or not it is appropriate and to take action accordingly. For example, if the parent deems it to be inappropriate, they can perform at least one of the following: (1) intervene in the call, (2) terminate at least one leg of the call between the first 102 and the second 104 communication devices, that is, selectively terminate communication to the first communication device 102 or the second communication device 104 but remain in communication with the other or remaining communication device, (3) establish voice communication with at least one of the parties to the call, (4) terminate the call leg to their communication device, (5) instigate recording of the call, (6) establish a call to a further contact number such as, for example, the police, (7) interrogate the database 114 or some other database to retrieve and listen to or view any recorded communication exchanges or (8) take any other action in relation to the call.

Embodiments that support the contacted third-party establishing a further call to a further contact number can be arranged to establish a call leg to the further contact number such that the further contact may be made party to the call between the first 102 and second 104 communication devices.

Accordingly, the database 114 may comprise a list of such further contact numbers. Alternatively, or additionally, establishing a call to a further contact number can be undertaken by the third-party dialling, using their communications advice, the further contact number.

Embodiments that support the contacted third-party establishing the further call to the further contact number can be arranged to establish the call leg to the further contact number such that the further contact may be made party to the call but limited to voice exchanges between the contacted third-party and the further third-party. Alternatively, or additionally, the contacted third-party can also, or alternatively, communicate with at least one of the first party using the first communication device 102 and the second party using the second communication device 104.

Figure 2:
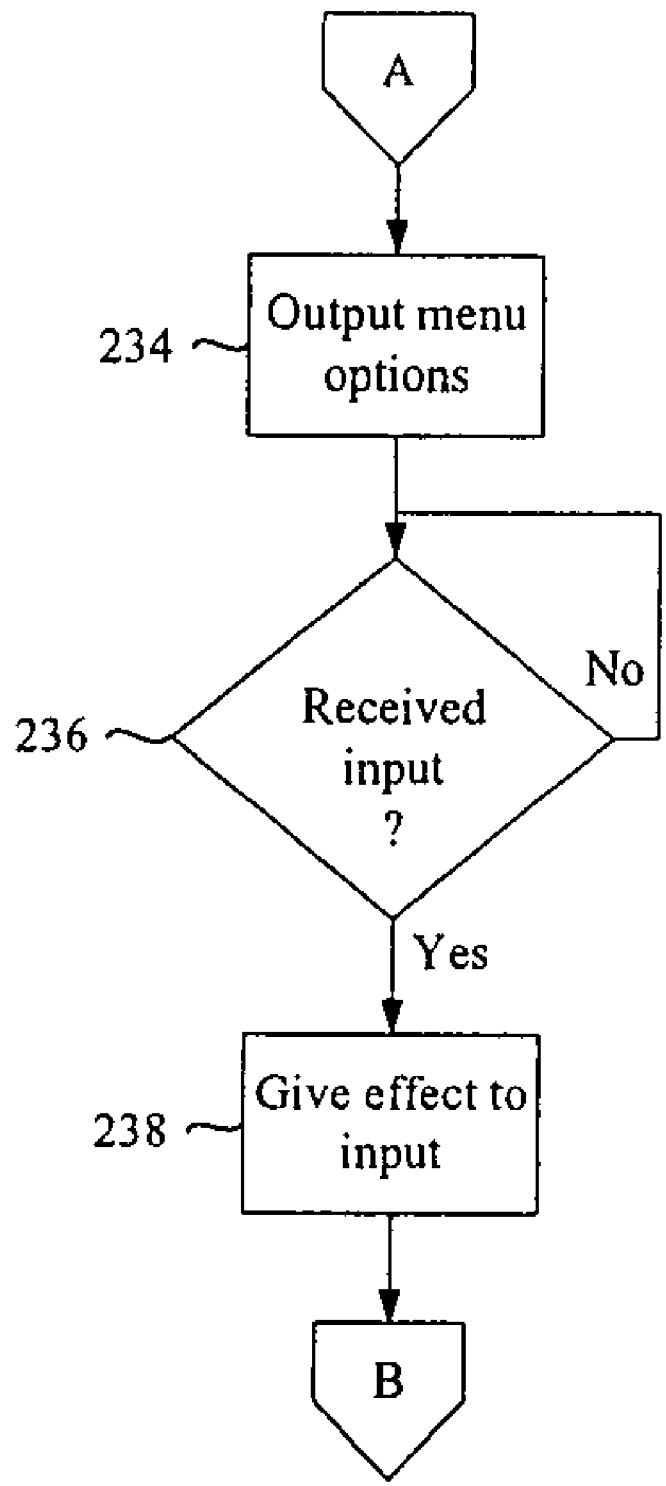
FIG. 2 shows a flowchart of processing undertaken by an embodiment.

Referring to FIG. 2, there is shown a flowchart 200 of processing undertaken by a communication system 110 according to an embodiment. At step 202, data identifying one of the parties to a call, or at least initiation of a call, is extracted from call set up signalling. The identification data may correspond to the calling communication device, a called communication device, an address or any other identification data, all of which are embodiments of a monitored number as described above with reference to FIG. 1. A determination is made, at step 204, as to whether or not the extracted number is stored within the database 114 as one of the monitored numbers 118. If the determination is negative, processing terminates. If, however, the determination is positive, voice data associated with the call, once it is established, is analysed at step 206. The analysis of the voice data may, in preferred embodiments, use one of the voice models 122 stored within the database 114. A determination is made, in light of that analysis, as to whether or not the analysed voice data comprises an adverse characteristic at step 208. In preferred embodiments, a conclusion that the voice data of the call has an adverse characteristic is reached as a consequence of the analysis of the voice data matching a corresponding voice model 122 stored within the database 114. If the determination at step 208 is negative, processing terminates. However, if the determination is positive, a respective contact number of the list of contact numbers 120 stored within the database 114 is retrieved at step 210. A call is placed to the retrieved contact number at step 212, that is, instigation of a call to the retrieved contact number is undertaken at step 212. A determination is made at step 214 as to whether or not the called contact number has been answered. If the determination is negative, processing terminates. However, if the determination at step 214 is positive, a message is output via the communication device corresponding to the contact number as to why the contact number has been called. In preferred embodiments, the output message may be derived from text, using a text-to-speech engine (not shown) of the communication system 110. At this point, embodiments can be realised in which the called contact number is automatically added into the call established between the first 102 and second 104 communication devices.

However, in preferred embodiments, an input is required before proceeding. Therefore, a determination is made at step 218 as to whether or not an input has been received via the communication device 106 corresponding to the called contact number. The input may, for example, be a password that is required before parental monitoring of the pending call is allowed. Alternatively, the input may correspond to one or more commands, using, for example, DTMF tones, as to how the call leg to the communication device corresponding to the contact number should interact or otherwise with the call pending between the first 102 and second 104 communication devices. If an input has not been received, processing merely loops to execute step 218 again. If the determination at step 218 is positive, a determination is made at step 220 as to whether or not an instruction to join the call leg to the third communication device 106 into the pending call between the first 102 and second 104 communication devices. If the determination is negative, the call to the third communication device 106 is terminated and, thereafter, processing terminates.

However, if the determination at step 220 is positive, a third party call is established at step 224 between the pending call and the called contact number such that the party using the third communication device 106 that corresponds to the called contact number can at least listen to the communication exchange between the parties using the first 102 and second 104 communication devices.

At any point during monitoring the call, the third party, using the third communication device 106, can make an additional input to which the call handler 112 can respond. Therefore, the call is constantly monitored at step 226 for any such further input. A determination is made at step 226 as to whether or not any further inputs have been made. If further inputs have not been received, processing merely loops thereby allowing the user of the third communication device 106 to continue to listen to the communication exchange. However, if the determination at step 226 is positive, a determination is made at step 228 as to whether or not an input to terminate their leg of the call to the contact number. If the determination is positive, processing continues at step 222. If the determination at step 228 is negative, a determination is made at step 230 as to whether or not, for example, to terminate the call to the non-monitored number or to terminate the call to a selectable one of the numbers corresponding to the first 102 and second 104 communication devices. If the determination at step 230 is positive, effect is given to the instruction to terminate the call to the selected one of the first 102 and second 104 communication devices at step 232 and processing resumes at step 226. If the determination at step 230 is negative, it is assumed that the caller requires some other action to be performed and a list of options reflecting, for example, any one of the above (1)-(7) or any other possible course of action is output via the third communication device 106 to the user thereof at step 234. A determination is made at step 236 as to whether or not an input has been received in response to the menu of possible options output at step 234. If the determination is negative, processing resumes at step 236. If the determination is positive, effect is given to the selected menu option at step 238 and processing resumes at step 226.

The above embodiments have been described with reference to the communication system and, more particularly, the call handler 112, establishing, or at least influencing, a call to the third communication device 106. However, embodiments are not limited to such an arrangement. Embodiments can be realised in which details associated with the call are recorded. For example, at least one of the calling communication device, called communication device, date, time, duration, voice data, keystrokes, data exchanged or any combination thereof of the call may be recorded.

The above embodiments have been described with reference to monitoring a voice communication between a first communication device 102 and a second communication device 104. Alternatively, or additionally, embodiments can be realised that monitor data exchanges such as message exchanges like SMS messages. In such embodiments, a call can be placed to an appropriate contact number indicating that messaging has taken place. Additionally, or alternatively, any messages exchanged between the first communication device 102 and the second communication device 104 can be at least one of stored for later retrieval or routed to the appropriate contact number.

In embodiments that record communication exchanges between the first 102 and second 104 communication devices, embodiments can be realised in which the contact number is used to notify the associated third-party that a communication exchange has been recorded. The associated third-party can retrieve and listen to or view the recorded communication exchange, that is, a database of recorded call data and communication exchanges are stored for interrogation by the third party associated with the contact number.

Although embodiments of the present invention have been described with reference to the voice models being associated with a male voice, embodiments are not limited to such an arrangement. Embodiments can be realised in which the voice models are associated with at least one of a female voice, a teenage male or female voice or a child's male or female voice.

The above embodiments have been described with reference to, for example, analysing voice data of a call as a precursor to determining whether or not to contact a third party as can be appreciated from step 206. However, embodiments are not limited to such an embodiment. Embodiments can be realised in which the third party is contacted prior to establishing the communication between the first and second parties. For example, the third party might be merely informed of an attempt to establish a communication between the first and second parties. The third party might be connected to the first party, that is, the first party, although initiating a call to a second party, is, in fact, connected to the third party. Such an arrangement might be useful if a child has been requested not to telephone a specific person. Alternatively, the third party might be connected to the second party, with or without the first being involved. Such an arrangement might be useful in circumstances where, for example, a specific person has been told not to speak to a child of the third party, or visa versa, and the third party wishes to emphasise this message by talking to the specific person directly.

Figure 3:
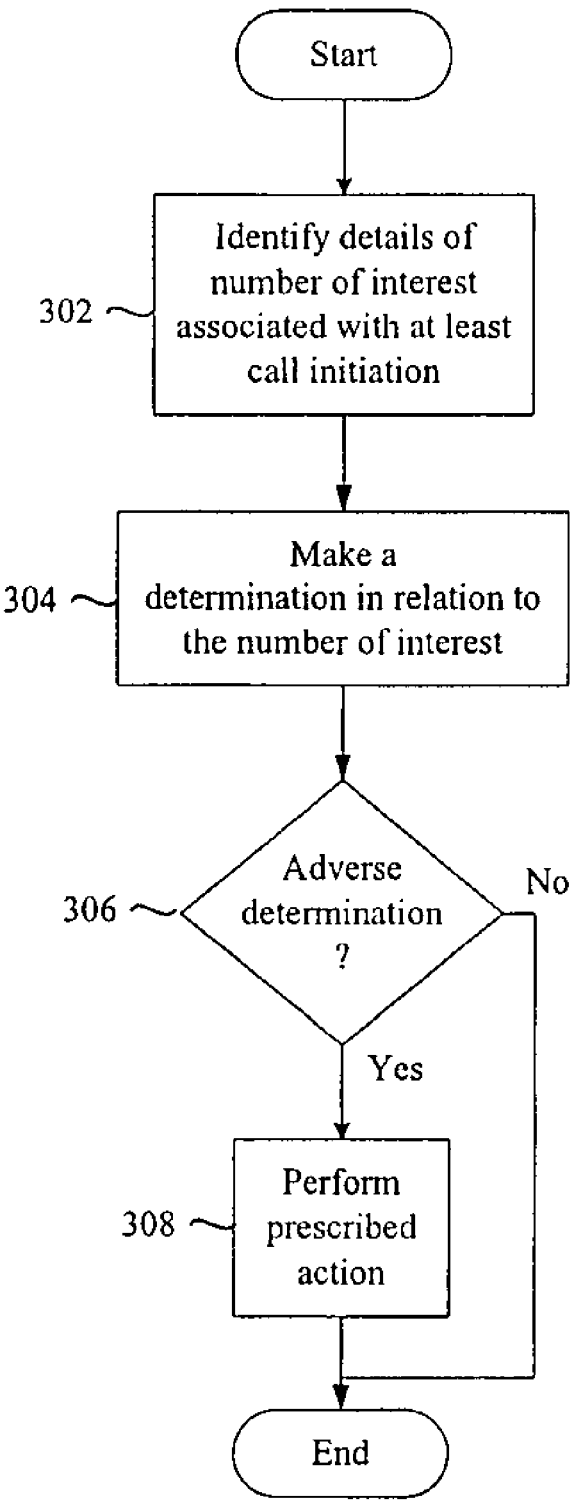
FIG. 3 shows a flowchart of processing undertaken by a further embodiment.

FIG. 3 shows a flowchart 300 of processing of further embodiments of the present invention. At step 302, data associated with at least initiating a call between first and second parties or, more particularly, between their respective communication devices, is identified. In a preferred embodiment, a number of interest is identified or at least details associated with such a number of interest are identified. A determination is made at step 304 in relation to number of interest. The determination may involve, for example, at least one of determining whether or not the number of interest is a number for which notification to a third party is required. For example, the number of interest might be on black list such that the other party or potential party to the call should not be allowed, under any circumstances, to communication with a person associated with the number of interest. It will be appreciated that the number of interest might be the calling number or the called number. The determination made at step 304 is assessed at step 306, that is, it is determined whether or not an adverse finding has been reached. If an adverse finding has not been made at step 306, processing terminates. However, if the determination is positive at step 306, prescriptive action is taken at step 308. The prescriptive action might comprise at least one of establishing a call to a third party, recording call details associated with the initiated call, blocking a call to the number of interest, or establishing a call having particular characteristics to the third party such as, for example, establishing a listen-only call to the third party.

Embodiments can be realised in which a number of interest, that is, a calling number or called number, might be on one of a number of lists, for example, a white list, grey list or black list with each of the lists having prescribed actions in relation to a third party. For example, numbers on the black list might cause a call to be established between the black-listed number and the third party without involving the first or second party. Alternatively, or additionally, a grey-listed number might allow a call to proceed but allow a third party to be contacted in a listen-only mode of operation. Suitably, embodiments can be realised in which the nature or capability of the call to the third party is response to the number of interest.

It can be appreciated that the embodiments described with reference to FIG. 3 have been described in relation to making the determination before the call between the first and second parties has been established. However, embodiments can be realised in which the call is actually established prior to making the determination.

Embodiments can be realised that are a combination of the embodiments described with reference to FIGS. 2 and 3, that is, making a determining as to whether or not to contact the third party based a characteristic of a pending call such as, for example, a voice characteristic and some other call characteristic such as, for example, calling or called number.

The above embodiments have been described with reference to a parent using the system to protect a child. However, embodiments are not limited thereto. Embodiments can be realised in which the system is used to monitor criminal activity or used by employers to realise employee performance monitoring during, for example, on-the-job training or assessment in a call-centre in an unobtrusive manner.

The invention claimed is:

1. A method comprising:
   identifying at least one of first and second contact numbers associated with a first call between a first communication device having the first contact number and a second communication device having the second contact number;
   accessing a database comprising monitored contact numbers and associated third party numbers corresponding to respective third parties, wherein the third party numbers identify respective third parties to be called, and wherein the third party numbers are associated with the monitored contact numbers within the database;
   determining whether or not at least one of the first contact number and the second contact number associated with said first call matches a particular one of the monitored contact numbers in the database, the determining being made by a voice processor analyzing whether there is a match between voice data associated with the first call and content of the database; and
   establishing, in response to the determining, a third party call to a third communication device corresponding to the third party number associated with the particular monitored contact number in the database.

2. The method as claimed in claim 1, wherein the analyzing comprises analyzing the voice data associated with the first call to determine if the voice data is characteristic of at least one of a male or a female voice.

3. The method as claimed in claim 1, wherein the analyzing comprises analyzing the voice data associated with the first call to determine whether or not it has a characteristic of voice data associated with a predetermined individual.

4. The method as claimed in claim 1, wherein establishing the third party call to the third communication device comprises establishing a voice path from at least one of the first and second communication devices to the third communication device.

5. The method as claimed in claim 1, wherein establishing the third party call to the third communication device comprises establishing a voice path from the third communication device of the third party call to support voice communication between a third party and at least one of the first and second communication devices.

6. The method as claimed in claim 1 further comprising terminating, in response to input from the third communication device after establishing the third party call, a call leg to a selectable one of the first and second communication devices.

7. The method as claimed in claim 1, wherein the third party call is established in a listen-only mode.

8. The method as claimed in claim 1, wherein the third party call is established if the voice data includes at least two persons prohibited from conversing.

9. The method as claimed in claim 1, wherein the third party call is established so that a third party can make a contribution to the first call.

10. The method as claimed in claim 1, wherein the third party call is established to support parental intervention in an inappropriate call involving a child.

11. The method as claimed in claim 1, further comprising recording the first call voice data.

12. The method as claimed in claim 9, further comprising recording a contribution of the third party to the first call.

13. The method as claimed in claim 1, further including terminating the third party call after a determination is made that the content of the first call is acceptable.

14. The method as claimed in claim 1, further comprising:
for a second call between a fourth communication device having a fourth contact number and a fifth communication device having a fifth contact number, determining whether or not at least one of the fourth contact number and the fifth contact number matches a second one of the monitored contact numbers in the database; and
establishing, in response to the determining of whether or not at least one of the fourth contact number and the fifth contact number matches the second monitored contact number, another third party call to a different third communication device corresponding to another third party number associated with the second monitored contact number in the database.

15. A system comprising:
a computer;
a call handler in the computer to:
establish a first call between a first communication device having a first contact number and a second communication device having a second contact number;
access a database containing monitored contact numbers and associated third party numbers corresponding to respective third parties, wherein the third party numbers identify respective third parties to be called, and wherein the third party numbers are associated with the monitored contact numbers within the database;
determine whether or not at least one of the first contact number and the second contact number associated with the first call matches a particular one of the monitored contact numbers in the database, where the determining is in response to an analysis of whether there is a match between voice data associated with the first call and content of the database; and
establish, in response to the determining, a third party call to a third communication device corresponding to the third party number associated with the particular monitored contact number in the database in the database.

16. The system of claim 15, wherein the call handler is to further:
for a second call between a fourth communication device having a fourth contact number and a fifth communication device having a fifth contact number, determine whether or not at least one of the fourth contact number and the fifth contact number matches a second one of the monitored contact numbers in the database; and
establish, in response to the determining of whether or not at least one of the fourth contact number and the fifth contact number matches the second monitored contact number, another third party call to a different third communication device corresponding to another third party number associated with the second monitored contact number in the database.

* * * * *

UNITED STATES PATENT AND TRADEMARK OFFICE
CERTIFICATE OF CORRECTION

PATENT NO. : 8,295,448 B2  Page 1 of 1
APPLICATION NO. : 11/716991
DATED : October 23, 2012
INVENTOR(S) : Robert H. Hyerle et al.

It is certified that error appears in the above-identified patent and that said Letters Patent is hereby corrected as shown below:

In the Drawings:

In Sheet 3 of 4, line 12, in Figure 2, below "  " insert -- 200 --.

In Sheet 4 of 4, line 16, in Figure 3, below "  " insert -- 300 --.

In the Claims:

In column 10, line 26, in Claim 15, after "contact number" delete "in the database".

Signed and Sealed this
Thirteenth Day of August, 2013

Teresa Stanek Rea
*Acting Director of the United States Patent and Trademark Office*